US011464260B2

(12) United States Patent
Turbovich

(10) Patent No.: US 11,464,260 B2
(45) Date of Patent: Oct. 11, 2022

(54) GARMENT

(71) Applicant: Irit Turbovich, Haifa (IL)

(72) Inventor: Irit Turbovich, Haifa (IL)

(*) Notice: Subject to any disclaimer, the term of this patent is extended or adjusted under 35 U.S.C. 154(b) by 0 days.

(21) Appl. No.: 13/848,303

(22) Filed: Mar. 21, 2013

(65) Prior Publication Data

US 2013/0247277 A1 Sep. 26, 2013

Related U.S. Application Data

(63) Continuation of application No. PCT/IL2012/050113, filed on Mar. 29, 2012.

(60) Provisional application No. 61/470,100, filed on Mar. 31, 2011.

(51) Int. Cl.
| A41B 13/00 | (2006.01) |
| A41D 27/08 | (2006.01) |
| A63H 33/00 | (2006.01) |
| G09B 19/00 | (2006.01) |
| A41D 1/215 | (2018.01) |
| A41D 27/00 | (2006.01) |

(52) U.S. Cl.
CPC ............ *A41B 13/00* (2013.01); *A41B 13/005* (2013.01); *A41D 1/215* (2018.01); *A41D 27/00* (2013.01); *A41D 27/08* (2013.01); *A63H 33/006* (2013.01); *G09B 19/00* (2013.01); *A41D 2400/32* (2013.01)

(58) Field of Classification Search
CPC ............. A41D 11/00; A41D 2400/32; A41D 2400/324; A41D 2400/36; A41D 27/00; A41D 27/08; A41B 13/06; A41B 13/065; A41B 13/08; A41B 13/00; A41B 2400/32

USPC ...... 2/75, 80, 111, 69.5, 113, 114, 244, 245, 2/246; 424/402; 5/482; 602/76
See application file for complete search history.

(56) References Cited

U.S. PATENT DOCUMENTS

| 2,374,299 | A | * | 4/1945 | O'Hara ........................... 2/69.5 |
| 2,520,300 | A | * | 8/1950 | Astrove ............................ 2/80 |
| 2,837,748 | A | * | 6/1958 | Manning et al. ................. 2/309 |
| 3,028,857 | A | * | 4/1962 | Parker .......................... 601/136 |
| 3,447,165 | A | * | 6/1969 | Brosk ................................ 2/75 |
| 3,478,748 | A | * | 11/1969 | Bjorn-Larsen ............... 450/111 |
| 3,636,566 | A | * | 1/1972 | Sutherland ...................... 2/69.5 |
| 3,775,775 | A | * | 12/1973 | Mazzenga .......................... 2/80 |
| 4,283,011 | A | * | 8/1981 | Spector .......................... 239/36 |
| 4,285,338 | A | * | 8/1981 | Lemelson ...................... 602/58 |

(Continued)

FOREIGN PATENT DOCUMENTS

| FR | 2824707 | 11/2002 |
| JP | 57-180721 | 11/1982 |

(Continued)

OTHER PUBLICATIONS

International Search Report for International Application No. PCT/IL2012/050113 dated Nov. 7, 2012.

(Continued)

*Primary Examiner* — Alissa L Hoey

(57) ABSTRACT

A method is provided for designing a garment having a plurality of surfaces. The method includes selecting at least one surface from the plurality of surfaces to serve as a tactile stimulating surface. The method further includes selecting a texture for the at least one surface, different from that of at least a majority of the plurality of surfaces, configured to provide tactile stimulation to a touch sensing organ.

8 Claims, 3 Drawing Sheets

(56) References Cited

U.S. PATENT DOCUMENTS

| | | | |
|---|---|---|---|
| 4,419,396 A * | 12/1983 | Sugimoto | 428/40.2 |
| 4,465,232 A * | 8/1984 | Field | 239/36 |
| 4,509,510 A * | 4/1985 | Hook | 601/28 |
| 4,519,781 A | 5/1985 | Boyd | |
| 4,710,979 A | 12/1987 | Bull et al. | |
| 4,728,538 A * | 3/1988 | Kaspar et al. | 427/288 |
| 4,802,244 A * | 2/1989 | McGrath-Saleh | 2/69 |
| 4,820,164 A * | 4/1989 | Kemper | 434/238 |
| 4,845,778 A | 7/1989 | Peterson | |
| 4,860,387 A * | 8/1989 | Williams | 2/244 |
| 4,975,985 A * | 12/1990 | Stimpson | 2/115 |
| 4,989,285 A * | 2/1991 | Troncone et al. | 5/482 |
| 5,086,519 A * | 2/1992 | Rokasky | 2/408 |
| 5,381,558 A * | 1/1995 | Lo | 2/115 |
| 5,606,748 A * | 3/1997 | Fujiwara | 2/406 |
| 5,678,251 A * | 10/1997 | Getz | 2/406 |
| 5,765,226 A * | 6/1998 | Douady et al. | 2/69 |
| 5,806,093 A * | 9/1998 | Summers | 2/69 |
| 5,809,577 A * | 9/1998 | Getz | 2/406 |
| 5,823,432 A * | 10/1998 | Hogan | 239/36 |
| 5,826,598 A * | 10/1998 | Meehan | 132/275 |
| 5,845,335 A * | 12/1998 | Twitty | 2/80 |
| 5,940,888 A * | 8/1999 | Sher | 2/267 |
| 5,957,692 A | 9/1999 | McCracken et al. | |
| 5,978,965 A * | 11/1999 | Summers | 2/69 |
| 6,067,663 A * | 5/2000 | Fernandez | 2/406 |
| 6,138,281 A * | 10/2000 | Chiaruttini | 2/239 |
| 6,272,888 B1 | 8/2001 | Fujita et al. | |
| 6,314,584 B1 * | 11/2001 | Errera | 2/239 |
| 6,332,825 B1 * | 12/2001 | Henricksen | 450/81 |
| 6,378,138 B1 * | 4/2002 | Ridgley et al. | 2/239 |
| 6,427,265 B1 * | 8/2002 | Dix | 5/482 |
| 6,626,536 B2 * | 9/2003 | Mesplay | 351/203 |
| 6,626,678 B2 * | 9/2003 | Forbes et al. | 434/247 |
| 6,708,342 B2 * | 3/2004 | Boersema | 2/69 |
| 6,921,316 B1 * | 7/2005 | Jian | 450/38 |
| 6,996,853 B2 * | 2/2006 | Gabriel | 2/174 |
| 7,048,160 B2 | 5/2006 | Anderson | |
| 7,207,953 B1 * | 4/2007 | Goicaj | 601/46 |
| 7,380,941 B1 * | 6/2008 | Alexander | 351/224 |
| 7,399,286 B2 * | 7/2008 | Jackson | 601/136 |
| 7,419,263 B1 * | 9/2008 | Pearce et al. | 351/203 |
| 7,653,948 B2 * | 2/2010 | Schwenner | 2/69 |
| 7,725,954 B2 * | 6/2010 | DelPrete et al. | 2/69.5 |
| 7,861,324 B2 * | 1/2011 | Chetelat et al. | 2/231 |
| 8,277,940 B2 * | 10/2012 | Desiderio et al. | 428/354 |
| 8,312,565 B1 * | 11/2012 | Alperin | 2/49.1 |
| 8,458,819 B1 * | 6/2013 | Hoole | 2/403 |
| 9,877,522 B1 * | 1/2018 | Martinson | A41B 17/005 |
| 10,589,058 B2 * | 3/2020 | Smith | A41D 7/005 |
| 2002/0069450 A1 * | 6/2002 | McNamara | 2/244 |
| 2003/0028168 A1 * | 2/2003 | Mesplay | 604/385.07 |
| 2003/0167027 A1 * | 9/2003 | Estrella et al. | 601/136 |
| 2004/0006805 A1 * | 1/2004 | Broeksmit | 2/80 |
| 2004/0068778 A1 | 4/2004 | Van Veghel et al. | |
| 2005/0050607 A1 * | 3/2005 | Myers | 2/69 |
| 2006/0010558 A1 * | 1/2006 | Prater | 2/111 |
| 2006/0041275 A1 * | 2/2006 | Powers | A61J 17/02 606/215 |
| 2006/0058845 A1 | 3/2006 | Fuisz et al. | |
| 2006/0185055 A1 * | 8/2006 | DeWitt | 2/111 |
| 2007/0172802 A1 | 7/2007 | Adams et al. | |
| 2007/0220674 A1 * | 9/2007 | Haskins et al. | 5/485 |
| 2009/0100566 A1 * | 4/2009 | Schiavino et al. | 2/80 |
| 2009/0117531 A1 | 5/2009 | Yoon | |
| 2009/0291108 A1 * | 11/2009 | Chen et al. | 424/402 |
| 2010/0093251 A1 * | 4/2010 | Viniotis | 446/295 |
| 2012/0117702 A1 * | 5/2012 | King | 2/2.16 |
| 2019/0059815 A1 * | 2/2019 | Smith | A41D 1/005 |

FOREIGN PATENT DOCUMENTS

| | | |
|---|---|---|
| JP | 07-005233 | 1/1995 |
| JP | 2000-220004 | 8/2000 |
| JP | 2005-042291 | 2/2005 |
| JP | 3115516 | 11/2005 |
| JP | 2008-512216 | 4/2008 |
| JP | 2009-074220 | 4/2009 |
| JP | 2009-221643 | 10/2009 |
| WO | WO 2006/031887 | 3/2006 |
| WO | WO 2010045499 | 4/2010 |
| WO | WO 2012/131681 | 10/2012 |

OTHER PUBLICATIONS

International Preliminary Report on Patentability dated Oct. 1, 2013 From the International Bureau of WIPO Re. Application No. PCT/IL2012/050113.
Communication Pursuant to Article 94(3) EPC dated Mar. 20, 2015 From the European Patent Office Re. Application No. 12722901.1.
Patent Examination Report dated Dec. 4, 2015 From the Australian Government, IP Australia Re. Application No. 2012235637.
Patent Examination Report dated Aug. 19, 2016 From the Australian Government, IP Australia Re. Application No. 2012235637.
Notice of Decision for Rejection dated Feb. 16, 2016 From the Japanese Patent Office Re. Application No. 2014-501812.
Communication Pursuant to Article 94(3) EPC dated May 3, 2016 From the European Patent Office Re. Application No. 12722901.1.
Translation Dated Feb. 25, 2016 of Notice of Decision of Rejection dated Feb. 16, 2016 From the Japanese Patent Office Re. Application No. 2014-501812.
Decision of Rejection dated Jun. 27, 2017 From the Japanese Patent Office Re. Application No. 2014-501812 and Its Translation Into English. (3 Pages).
Office Action dated Nov. 30, 2017 From the Israel Patent Office Re. Application No. 228394 and Its Translation Into English. (9 Pages).
Invitation Pursuant to Rule 62a(1) EPC Dated Apr. 25, 2018 From the European Patent Office Re. Application No. 18150856.5. (2 Pages).
Examination Report dated Mar. 19, 2018 From the Australian Government, IP Australia Re. Application No. 2017201940. (4 Pages).
Requisition by the Examiner dated Feb. 2, 2018 From the Innovation, Science and Economic Development Canada, Canadian Intellectual Property Office Re. Application No. 2,831,058. (7 Pages).
European Search Report and European Search Opinion dated Jul. 25, 2018 From the European Patent Office Re. Application No. 18150856.5. (11 Pages).
Notice of Reasons for Rejection dated Nov. 27, 2018 From the Japan Patent Office Re. Application No. 2017-208612. (3 Pages).
Office Action dated Oct. 23, 2018 From the Israel Patent Office Re. Application No. 228394. (2 Pages).
Translation Dated Dec. 7, 2018 of Notice of Reasons of Rejection dated Nov. 13, 2018 From the Japan Patent Office Re. Application No. 2014-501812. (5 Pages).
Translation Dated Dec. 13, 2018 of Notice of Reasons for Rejection dated Nov. 27, 2018 From the Japan Patent Office Re. Application No. 2017-208612. (3 Pages).
Examination Report dated Feb. 21, 2019 From the Australian Government, IP Australia Re. Application No. 2017201940. (4 Pages).
Communication Pursuant to Article 94(3) EPC dated Nov. 8, 2019 From the European Patent Office Re. Application No. 18150856.5. (12 Pages).
Examination Report dated Mar. 16, 2020 From the Australian Government, IP Australia Re. Application No. 2019201913. (4 Pages).
Examination Report dated Mar. 18, 2019 From the Australian Government, IP Australia Re. Application No. 2017201940. (4 Pages).
Notice of Reasons of Rejection dated Sep. 10, 2019 From the Japan Patent Office Re. Application No. 2014-501812. (4 Pages).
Notice of Rejection dated Sep. 17, 2018 From the Japan Patent Office Re. Application No. 2017-208612 and Its Translation Into English. (5 Pages).

(56) References Cited

OTHER PUBLICATIONS

Requisition by the Examiner dated Feb. 6, 2020 From the Innovation, Science and Economic Development Canada, Canadian Intellectual Property Office Re. Application No. 2,831,058. (6 Pages).
Requisition by the Examiner dated Jun. 20, 2019 From the Innovation, Science and Economic Development Canada, Canadian Intellectual Property Office Re. Application No. 2,831,058. (3 Pages).
Translation Dated Oct. 2, 2019 of Notice of Reasons of Rejection dated Sep. 10, 2019 From the Japan Patent Office Re. Application No. 2014-501812. (5 Pages).
Office Action dated Aug. 31, 2020 From the Israel Patent Office Re. Application No. 265890 and Its Translation Into English. (8 Pages).
Office Action dated Mar. 15, 2021 From the Israel Patent Office Re. Application No. 265890 and Its Translation Into English. (5 Pages).
Translation of Notice of Rejection dated Oct. 18, 2016 From the Japanese Patent Office Re. Application No. 2014-501812. (4 Pages).
Notice of Reason for Rejection dated Oct. 18, 2016 From the Japanese Patent Office Re. Application No. 2014-501812.
Office Action dated Jun. 19, 2022 From the Israel Patent Office Re. Application No. 290051. (5 Pages).

\* cited by examiner

GARMENT

FIELD

This invention relate to a sensory stimulating artifact in general and in particular to a garment for stimulating tactile stimulation.

BACKGROUND

There are known many objects for providing tactile stimulations for babies, young children, and even adults. The purpose of these objects is typically directed to sensory development of children, curing neural diseases, and relaxation of tensed nerves.

Over time, it seems that conciseness of parents regarding the importance of sensory stimulation are ascending ever than before. Thus, a variety of stimulating products are available, such as pictures, books, toys, and mobiles for visual stimulation, music and sound toys, for auditory stimulation, and toys with different shape and textures for providing tactile stimulation.

When it comes to young babies, it seems that most means for visual and auditory stimulation are fulfilling their purpose. All the baby has to do is lie down on his back and watch a mobile moving right above him, to get a visual input of the figures or shapes through his eyes or an auditory input of the music playing, using his ears.

However, when it comes to tactile stimulation, a direct contact between the stimulus and a young baby's skin (tactile sensory organ) is required. Thus, unless when given to a baby with caregiver's initiation and involvement (holding the baby or his hands in the right posture for touching or touching baby's skin with tactile stimulation), initiation and activity are required from a baby to take in such a stimulation: a hand (or mouth) reaching towards a desirable object, grasping and manipulating it for exploration reasons, mainly by hands or mouth.

In fact, besides tactile stimulation initiated by the caregiver, baby's tactile experience is quite limited to chance encounters with appropriate objects. But, as many parents and caregivers know, even the most dedicated caregiver is dealing with other daily tasks (driving, caring for other family members, house works, hobbies etc.) as well, or may not be aware of the importance of frequency and quality and variety of tactile stimulation. On the other hand, one cannot expect a newborn to intentionally reach a tactile stimulating toy or to express his interest in stimulation such as this one, for quite a while.

GENERAL DESCRIPTION

Herein the specification and claims, the term "garment" as refer to herein after, shall mean any garment which is intended to be worn by a user including an infant, child, adult, a non-human animal or a plant, the garment can be any article of clothing including, but not limited to, a shirt, pants, dress, skirt, overall, coat, jacket, sweatshirt, sweater, or any clothing accessory such as a belt, a tie, and the like.

The presently disclosed subject matter provides a method for designing a garment having a plurality of surfaces, the method comprising: selecting at least one surface from said plurality of surfaces to serve as a tactile stimulating surface; and selecting a texture for the at least one surface, different from that of at least a majority of the plurality of surfaces, configured to provide tactile stimulation to a touch sensing organ.

The method can further include selecting a first material for producing at least the majority of surfaces, and selecting a second material different from the first material, for producing the at least one surface.

The second material can be a material which is not suitable for producing the entire garment. The texture of the tactile stimulating surface can be one which is not suitable for being a texture of the majority of surfaces in view of intended use of the garment.

The method can further include selecting a location of the tactile stimulating surface relative to the majority of surfaces so as to allow it to be readily accessible by the touch sensing organ during intended use of the garment. And in case the garment is a baby garment, the location can be selected so as to be accessible by involuntary movements and reflexes of the baby wearing of the garment. In case garment is a garment for a user holding a baby the location can be selected so as to be accessible by involuntary movements and reflexes of the baby.

The tactile stimulating surface can be an inner surface of the garment when worn as intended, and the location is selected so as to be accessible to wearer of the garment in a manner which does not attract attention of an exterior viewer.

The at least one surface can be repeatedly detachably attached to at least one of said plurality of surfaces.

The at least one surface includes two or more tactile stimulating surfaces one of which is selectively attached by the user to at least one of said plurality of surfaces.

According to another aspect of the presently disclosed subject matter there is provided a combination of garment and an annotation, wherein the garment comprises
   (a) a plurality of surfaces; and
   (b) a tactile stimulating surface having a texture different from that of at least a majority of the plurality of surfaces, and configured to provide tactile stimulation to a touch sensing organ.

The annotation comprises information regarding the tactile stimulation.

The tactile stimulating surface can be made of a material different from that of at least one of the plurality of surfaces.

The material of the tactile stimulating surface can be a material which is not suitable for producing the entire garment.

The texture of the tactile stimulating surface can be one which is not suitable for being a texture of the plurality of surfaces in view of intended use of the garment.

The combination can further comprise coupling means for detachably attaching the tactile stimulating surface to at least one of the plurality of surfaces. The coupling means are configured for repeatedly attaching and detaching the tactile stimulating surface. The garment includes a plurality of tactile stimulating surfaces each having a texture being different from the texture of other surfaces, wherein the tactile stimulation differs between each of the surfaces.

The garment further comprises marking for indicating at least one location on at least one of the a plurality of surfaces on which the tactile stimulating surface can be mounted, wherein the location is readily accessible by a touch sensing organ during the intended use of the garment.

The annotation is in the form of at least one of the following: label attached to the garment or its package, an indication on the garment.

According to another aspect of the presently disclosed subject matter there is provided a combination of a kit and an annotation, wherein the kit comprises at least one tactile stimulating element having a texture for providing a tactile stimulation to a touch sensing organ; and a mounting arrangement for coupling the element to an object having an intended use other than the tactile stimulation; and the annotation comprises indication regarding the tactile stimulation.

The kit comprises the object. The object can include marking thereon, indicating to at least one location on which the stimulating element can be mounted, wherein the location is readily accessible by a touch sensing organ during the intended use of the object. The kit can comprise a plurality of tactile stimulating elements having textures different from one another.

The object can be a garment material of the tactile stimulating surface is a material which is not suitable for producing a garment.

The mounting arrangement can be configured for detachably attach the tactile stimulating element to at the object. And can be configured for repeatedly attaching and detaching the tactile stimulating element.

The annotation is in the form of at least one of the following: label attached to the garment or its package, an indication on the garment.

According to another aspect of the presently disclosed subject matter there is provided a garment comprising a first surface constituting at least a portion of the garment and at least one second surface having a texture being different from that of the first surface, the second surface is coupled to the first surface and is configured for providing tactile stimulation to a touch sensing organ, wherein the texture of the second surface is not suitable for being a texture of the garment in view of intended use of the garment.

The garment can be a baby garment and wherein the second surface is coupled to the first surface at a location thereon readily accessible by involuntary movements and reflexes of the baby wearing of the garment.

The second surface is an inner surface of the garment when worn as intended, and wherein the second surface is coupled to the first surface at a location thereon accessible to wearer of the garment in a manner which does not attract attention of an exterior viewer. The second surface includes at least three surfaces.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
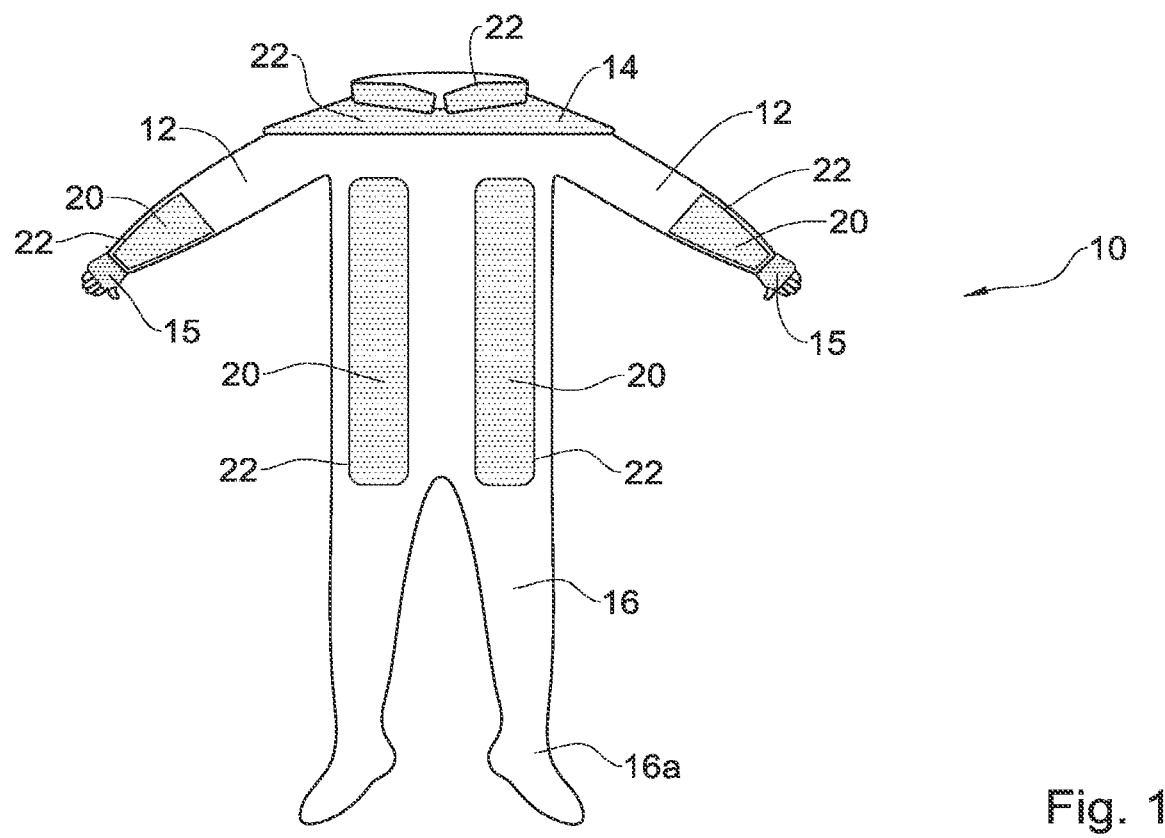
FIG. 1 is front view illustration of a baby garment having a tactile stimulation surface mounted thereon, in accordance with an example of the presently disclosed subject matter.

FIG. 1 illustrates a baby garment 10, here illustrated as a baby overall, having a plurality of surfaces, such as sleeve surfaces 12, a collar surface 14, leggings surfaces 16, and feet covering surfaces 16a. At least one of the surfaces of the garment 10 is provided with a texture 20, which is intended to provide tactile stimulation to a touch sensing organ, for example the fingers of the baby wearing the garment. The one or more surfaces which are provided with the tactile stimulating texture serve as a tactile stimulating surface 22, which can be located on the garment in a location relative to other surfaces of the garment, which allows the baby wearing the garment to access it with one of his/her a touch sensing organ.

According to an example, the garment 10 includes a plurality of tactile stimulating surface 22, disposed on the garment in such a way so as these surfaces are accessible by involuntary movements and reflexes of the baby wearing of the garment. For example, the tactile stimulating surface 22 can be disposed around surfaces of the garment covering the forearms or the wrist, or surfaces covering the abdomen, etc, which are accessible with the hand of the baby, even in an involuntary movements thereof. The tactile stimulating surface 22 may disposed on the collar of the garment, or can constitute the collar, on the inner side or outer side thereof, in such a way that it can be reached and touched by the skin of the chin or the cheeks, in voluntary or involuntary movements of the baby. In addition, the tactile stimulating surface can be located in such a way so as to allow the baby to access it with his lips, tongue, or teeth or alternatively, for example for a disabled baby, by his/her feet, toes.

The tactile stimulating surfaces being readily accessible to the baby are provided so as to allow the baby to touch these surfaces thereby assisting him in developing the sense of touch, in a similar fashion as known and provided baby toys having a stimulating textile designated to develop the sense of touch. However, the surfaces being coupled to the baby garment renders the tactile stimulation readily accessible to the baby at any time without having to reach far, or to grasp a toy with his hands. It is further noted, that positioning the tactile stimulating surfaces on the garment in such a way so as to allow reaching thereof by involuntary movements, allows the baby wearing the garment to benefit from the tactile stimulation even if his motor skills are not yet developed enough to reach or grasp these surfaces in a voluntary movement.

According to one example, the tactile stimulating surface is partially or fully covered with a layer of material, one which can be removed, so as to allow access thereof. This way, a mother taking care of the baby can choose when to uncover the stimulating surface so as to encourage the baby to touch it. In addition, the cover can be utilized to urge the baby to remove it, so as to access the stimulating surface underneath, thereby developing his/her fine motor skills. In addition, a different kind of cover may be used, the cover provides a different kind of tactile stimulation, for example, when the user touches the cover the texture underneath can be felt and thus stimulation is formed. However the user can choose to reach the tactile stimulating surface underneath the cover, directly touching the texture thereby enriching the possibilities of stimulation.

Figure 2:
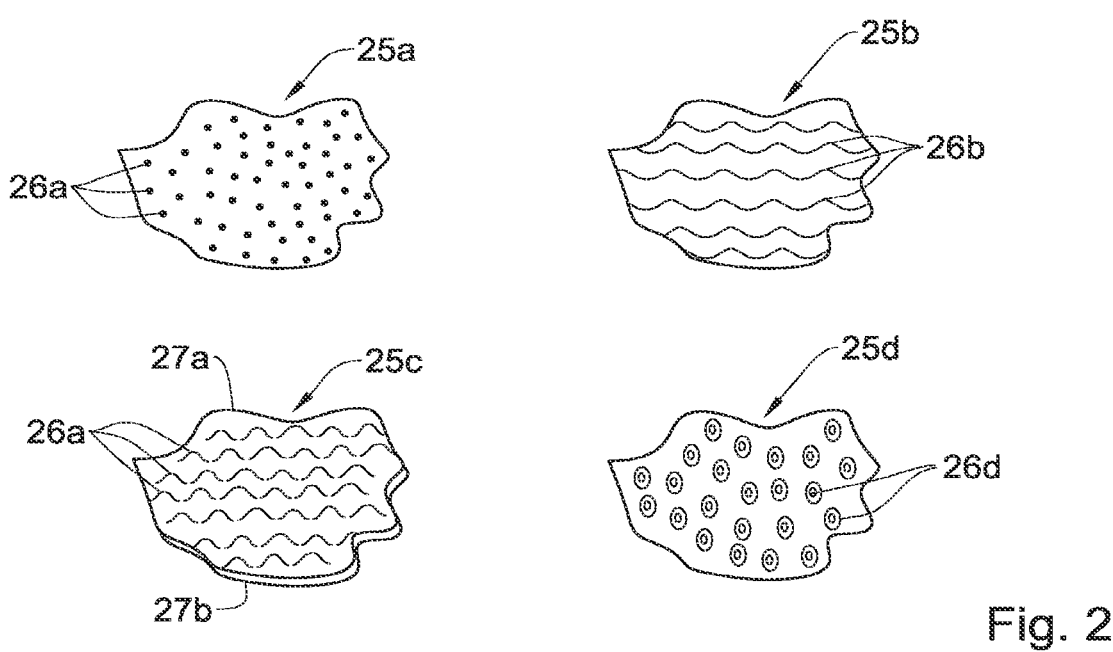
FIG. 2 is top view illustration of a plurality of surfaces each having a texture for providing tactile stimulation.

FIG. 2 show a number of tactile stimulating surfaces 25a, 25b, 25c, and 25d, which can be integrated in a garment, such as a baby garment, each of which including a textile and/or material different than the textile and/or the material of other surfaces. For example, surface 25a includes a plurality of rigid elements 26a, which can be made of plastic, rubber etc. Surface 25b on the other hand includes a plurality of ridges 26b protruding therefrom. The width of ridges, their length and spacing between them can vary thereby constituting different textures. The ridges can be made of a plastic material, or can be made of the same material as the surface itself. Surface 25c includes rigid elements contained between two portions of material 27a and 27b, such as a bag of beans. Surface 25d, includes a plurality of inflatable elements 26d, which can be pressed by the user. In addition the entire tactile stimulating surface can be one which is flexible, similar to a "relax ball" or a "soap ball", etc.

It is appreciated that the surface can be in a geometrical shape, such which can be sensed when touching the peripheral portions thereof. This way, a garment can be provided with a few stimulating surfaces each having a peripheral geometrical shape which can be detected by the user touching thereof, thereby providing him with shape recognition practice.

It is appreciated that the tactile stimulating surface can be made of material which is not suitable for producing the entire garment, such as plastic, rubber, wood, etc. In addition, the texture of the tactile stimulating surface can be such which is not suitable for being a texture of other surfaces of the garment in view of intended use of the garment, for example, the texture can be a plurality of folds in the material of the garment on one are thereof, constituting the tactile stimulating surface.

It is further appreciated that the material of the surface can be any material including but not limited to, velvet, sandpaper, wool, rubber, felt, silk, cellophane- or cellophane like material, strings, different leathers, different furs, suede, fleece, nylon, polyester, plastic, lace, different metals, different woods, and other different natural or artificial materials.

Figure 3:
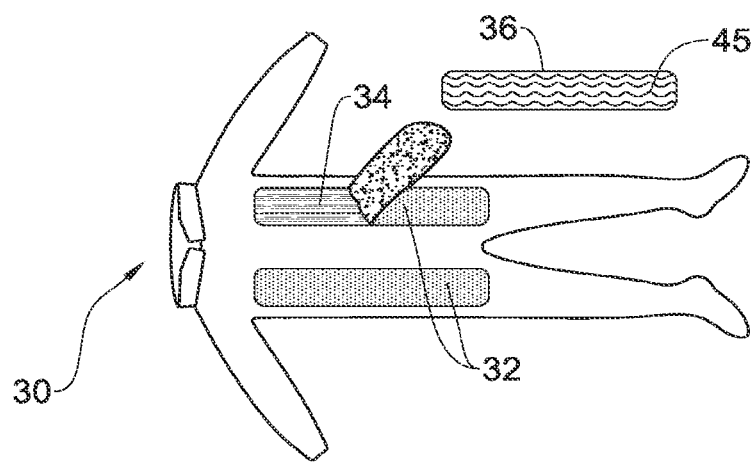
FIG. 3 is a front view illustration of a baby garment having a tactile stimulation surface mounted thereon, in accordance with another example of the presently disclosed subject matter.

FIG. 3 illustrates a baby garment 30 having a tactile stimulating surface 32, mounted on the abdomen covering portion of the garment. According to this example, the tactile stimulating surface 32 is an element separate from the garment, which is configured to be coupled thereto by coupling means 34. The coupling means can be configured for detachably attaching the tactile stimulating surface 32 to a surface of the garment 30, for example adhesive material. According to one example the coupling means 34 can be such which allows for repeatedly attaching and detaching the tactile stimulating surface, such as a Velcro strip tape, a magnet, a button, a hook, a clasp, a zipper, a string, a ring, a chain etc. This way, the user of the garment, in this case the mother or the person taking care of the baby, can select whether to attach the tactile stimulating surface 32 to the garment 30 or not. It is appreciated that this way, the tactile stimulating surface 32 can be removed from the garment 30, for example, when the baby is put to sleep, or when the garment is washed and then attached back to the garment 30 so as to allow the baby to enjoy the tactile stimulating surface. In addition, this way, the tactile stimulating surface 32 can be removed and washed separately. In addition, the garment can be provided with another tactile stimulating surface 36, having a texture 37 different than that of the tactile stimulating surface 32, and configured to provide a different tactile stimulation. Similarly, the garment 30 can be provided with a variety of tactile stimulating surfaces 32 each having a different texture configured to provide a certain sensation of tactile stimulation.

According to an example, the detachably attached tactile stimulating surface is attached to the garment in such a way so as to allow the baby can pull the surface for example, with a spring allowing the baby to bring the surface closer to his/her mouth, or examine it from all sides. In addition, this way, the stimulation surface can include textures on more than one side thereof, so the surface may be flipped and the user can touch the textures one all sides thereof.

In addition, the coupling mean can such that attaching or detaching the surface provides motor skill training to the baby. This can be carried out for instance if the coupling means imposes some resistance to the detachment action, such as with a spring.

It is appreciated that the coupling means can be such which allows coupling the tactile stimulating surfaces 32 to any surface of the garment 30, so as to allow the user to select the desired location thereon. Such coupling means can be for example a sticker, a safety pin, a bobby pin, etc. This way, the user can couple the tactile stimulating surfaces 32 to the garment 30 on a location thereon which the baby most frequently touches, or most accessible to the baby.

According to an alternative example, the garment 30 can be provided with a number of locations thereon to which the tactile stimulating surface 32 can be coupled. Each such location can include a coupling element for attaching tactile stimulating surface 32 thereto. For example, one side of a scotch tape can be attached to the garment on predetermined locations thereon, tactile stimulating surface 32 is provided with a corresponding side of the scotch. The user can select to which of these locations to attach the tactile stimulating surface 32.

Alternatively, the garment can include marking indicating locations thereon which are recommended for attaching thereto the tactile stimulating surfaces. These locations can be selected by the garment designer for example in accordance with statistics showing areas which are most frequently touched by babies. It is appreciated that determining the desired location for mounting the tactile stimulating surface 32 thereon can be carried out in accordance with the age of the user and his/her level of motor skills and development. For example, the garment can be a child garment, and the locations thereon can be selected such that the child can naturally access and touch the tactile stimulating surface 32 during the course of the day, for example while sitting on the floor and playing.

As mentioned hereinabove, in any of the above examples when the garment is a baby garment, especially a young baby whose motor skills are not yet developed to reach or grasp surfaces using voluntary movements, the location of the surface on the garment is selected so as to allow reaching the surface by involuntary movements. The garment is provided specifically for wearing by a baby, the wearing being in fixed positional arrangement at successive times in respect of the baby. These locations may be determined by observing repeated involuntary movements of babies whose motor skills are not developed enough to reach or grasp surfaces using voluntary movements and thus noting locations on said garment which can be expected to be frequently touched, which means finding locations ready reached by the involuntary movements.

For example, the tip of the fingers of one's hand may reach the other hand, or the sleeve covering the other hand and the trunk, upper thighs ("pants pockets"), which are also frequently, being touched by the posterior side of the fingers as well as other areas. Similarly, the mouth and cheeks often rub or "taste" against a collar or hood edges, the posterior side of the hands and as well as sleeves from wrists up to the elbow. As for older babies' (about 5-6 months old) hands can voluntary touch other body areas as well, such as the lower tummy is often reached with their hands, as well as the neck, thighs, knees, feet.

According to another example, the garment can be mittens or cut gloves with a tactile stimulating surface thereon, such as the cut gloves 15 shown in FIG. 1.

According to an example the tactile stimulating surface can be provided with another sensory stimulation such as visual, by providing for example, the surface with a color different than the color of the garment. Similarly, the surface can be associated with a certain smell of can be provided with means for actuating noise, such as a rustling surface, or a bell. In addition the surface can be associated with a certain smell, such which is formed by the material (leather), or such which is added to the surface (perfume, for example).

For example, the tactile stimulating surface can be a reflecting surface, such as a mirror with texture. Alternatively, the surface can be provided with one or more LEDs or other illuminating devices, which can be configured to operate in response to the user touching the surface.

According to an example the tactile stimulating surface can be part of a kit which can include a variety of tactile stimulating surfaces each having a designated texture, and can further include a garment on which the surfaces can be selectively mounted. The kit can include other sensory stimulating products, such as smell, noise, and visual stimulations.

It is appreciated that the garment and the tactile stimulating surfaces can be provided with an annotation including information regarding the tactile stimulation. For example, the annotation can provide information regarding the texture of the surface. The textures can be characterized in different levels and in different scales such as: roughness versus smoothness, hardness versus softness, as well as sharpness, stickiness, slipperiness, graininess, oiliness, etc. The annotation can be utilized to assist the user in determining the desired tactile surface, in particular when the garment is provided with a number of detachable surfaces each having a designated texture.

The annotation can be means of guidance such as a book, a CD, a DVD, a link to a related website, human guidance-lectures etc, which may include: instructions, recommendations, and enrichment issues such as empirical information or theories of chosen disciplines.

The present disclosed subject matter refers also to a method of designing a garment having a plurality of surfaces. The method which can be carried out by a designer or manufacturer includes selecting at least one surface from the plurality of surfaces of the garment which is to serve as a tactile stimulating surface. In addition the method includes selecting a texture for the tactile stimulating surface which is configured to provide tactile stimulation to a touch sensing organ. The texture can be for example, one of the above mentioned textures. In addition the method can includes the step of selecting a material different from the material of the garment, for producing the tactile stimulating surface, and can further include the step of determining the location of the surface so as to allow it to be reached by involuntary movements of the user wearing the garment.

Figure 4:
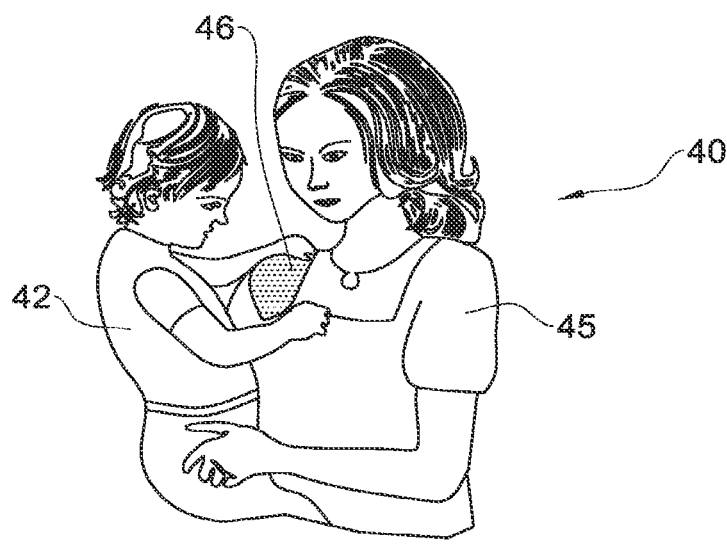
FIG. 4 is a front view illustration of a mother holding a child while wearing a garment having a tactile stimulation surface mounted thereon, in accordance with another example of the presently disclosed subject matter.

FIG. 4 shows a mother 40 holding a young child 42, and wearing a garment 45 having a tactile stimulating surface 46. According to the illustrated example, the garment 45 is a shirt, and the tactile stimulating surface 46 is coupled to the shoulder covering portion of the garment. This way, the child 42 can access and touch the tactile stimulating surface 46 while being held by the mother 40. It is appreciated that the tactile stimulating surface 46 can be mounted on any location on the mother's shirt, such that the child readily accesses it. According to another example, the garment which is worn by a person taking care of the child, is not a conventional garment, rather it is a special article of clothing which is intended to be worn for the purpose of taking care of the baby, and providing him with the tactile stimulation as well as other stimulation. This can be for example an apron, which includes a plurality of stimulating surfaces, and other stimulating accessories. As described hereinabove with regards to garment 30 of FIG. 3, the tactile stimulating surfaces 46 can be provided with coupling means which allows detachably attaching thereof to any desired location on the garment. This way, the tactile stimulating surface 46 can be mounted on any location which the mother sees as most accessible to the child, in accordance with his/her age and motor skills, and in accordance with the position in which he/she are held. For instance, for an infant who is snuggled by the mother, the tactile stimulating surface 46 can be coupled to the chest covering portion of the shirt, in such a way that the baby snuggled by the mother, can touch the surface 46, with his hands or cheeks. It is further appreciated that the surface 46 can be selected in accordance with the desired texture, for example one user might prefer at a certain time velvet texture while preferring a rigid elements at a different time, and a second user might prefer a third texture.

According to another example, a garment with a tactile stimulating surface is provided for children or adults. According to this example, the garment can be a regular garment, such as a shirt pants, skirt, coat, etc. However, the tactile stimulating surface is provided in such a way to readily accessible by the user of the garment. The location of the tactile stimulating surface can be in an inner surface of the garment, when worn as intended, so that the user can touch the surface in a manner which does not attract attention of an exterior viewer. For example, the tactile stimulating surface can be inside a pocket of the pants, so that the child or adult wearing the pants can put his/her hands in the pocket and access the surface with his/her hand. Alternatively, the tactile stimulating surface can be placed on the thighs and knees area. When located around these areas, the texture can be felt while sitting next to a desk. Thus, the user can benefit the surface and derive the necessary tactile stimulation while not attracting attention of an exterior viewer.

It is appreciated that the garment can be such which is worn by a non-human animal, for example for the purpose of developing tactile sense, or as an enrichment or one which is worn by an animal caregiver, for example for the purpose of developing the tactile sense of the animal held by the caregiver. Similarly, the garment can be one which is configured to be "warn" by plants, in particular those which are known to have a tactile sense.

Figure 5:
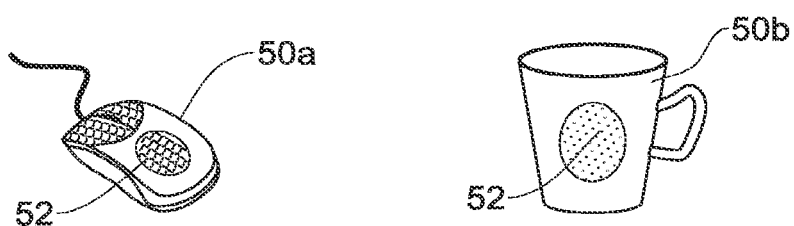
FIG. 5 is a front view illustration of objects having a tactile stimulation surface mounted thereon, in accordance with another example of the presently disclosed subject matter.

FIG. 5 shows objects such as a computer mouse 50a and a coffee mug 50b having a tactile stimulating element 52 mounted thereon. The element can be mounted by coupling means such as adhesive material, magnet etc. the tactile stimulating element can be provided as a kit having one or more such elements and coupling means for coupling thereof to an object. The elements can be configured to be mounted on a specific object, such as a coffee mug, or can be configured to be mounted on one of a group of objects. In addition the various tactile stimulating elements in the kit can each have a different texture, thus allowing the user to select the desired elements for example in accordance with his/her personal preferences.

It is further appreciated that the kit can include the object on which the tactile stimulating element is mounted. The object can be for example, a mug a cellular phone cover, a garment, etc. It is noted that in order to indicate to the user the purpose of the different elements, the kit can be provided with an annotation indicating that the elements are provided with a texture for stimulating tactile senses.

Figure 6:
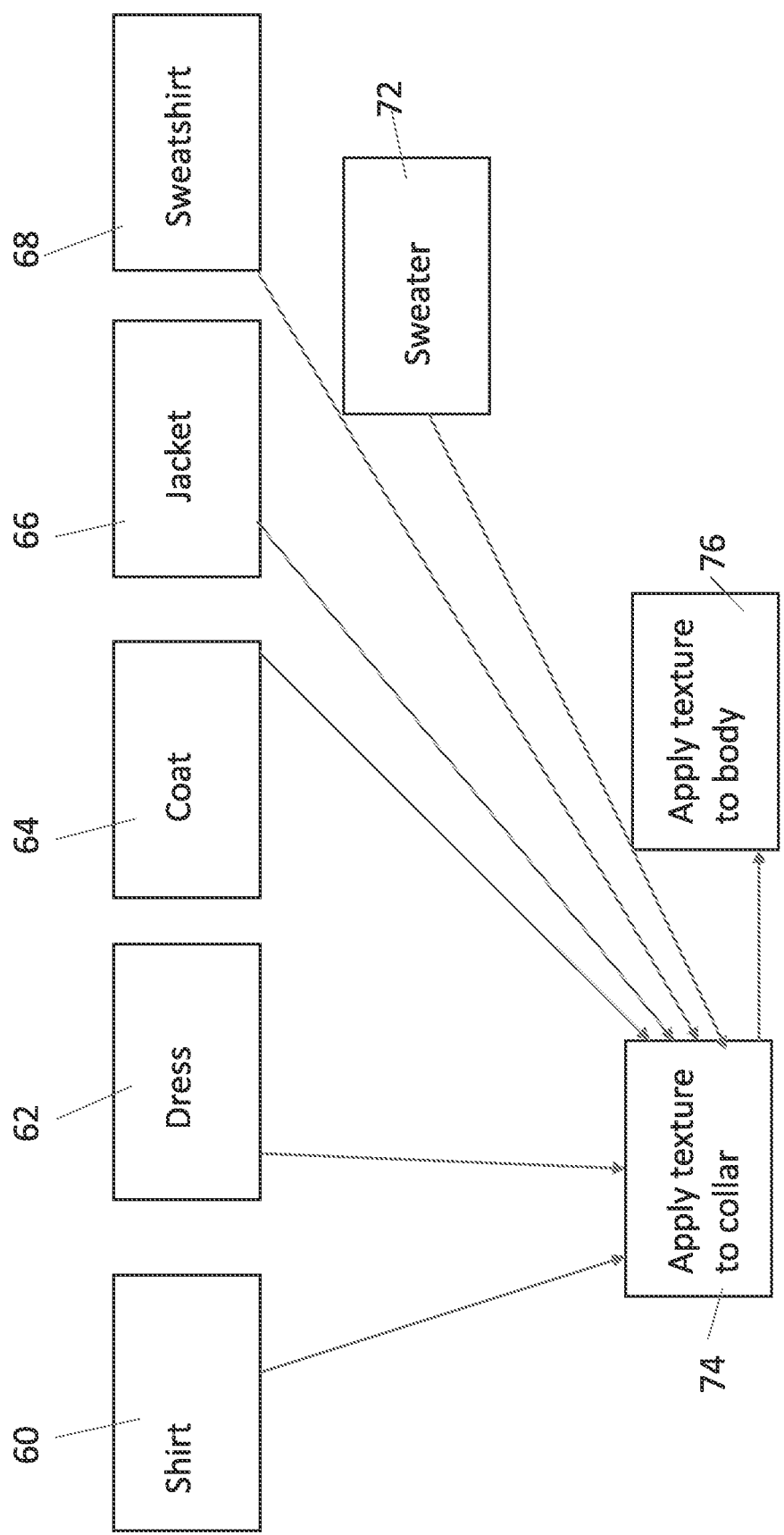
FIG. 6 is a simplified drawing showing a process of inserting tactile stimulation surfaces to a garment including a collar according to embodiments of the present invention.

Reference is now made to FIG. 6, which illustrates a shirt 60, a dress 62, a coat 64, a jacket 66, a sweatshirt 68 and a sweater 72, to which texture is applied to the body of the garment 74 and to which a texture is applied to a collar 76.

Those skilled in the art to which the presently disclosed subject matter pertains will readily appreciate that numerous changes, variations, and modifications can be made without departing from the scope of the invention, mutatis mutandis.

The invention claimed is:

1. A method for designing a tactile stimulation garment for providing tactile stimulation to a baby, the tactile stimulation garment being an item of clothing made primarily for wearing, the method comprising:
   providing a garment, the garment being an item of clothing designed for wearing in fixed positional arrangement relative to body regions of said baby, and the garment being one member of the group consisting of:
   a sleeved garment,
   a garment having legs,
   a garment having a neck opening within shoulders,
   a shirt,
   a dress,
   an overall,
   a coat,
   a jacket,
   a sweatshirt, and
   a sweater,
   said garment having a collar and a plurality of additional surfaces;
   observing involuntary baby movements-, and finding locations on said garment when worn which correspond to those of said body regions which are observed to be more frequently reached by said involuntary movements;
   selecting at least one of said more frequently reached locations as a selected location on said garment to serve as a tactile stimulating surface of said garment; and
   applying a texture to a surface at said selected location to provide a textured surface, said texture being applied differing from a surrounding texture of a remainder of said garment, said textured surface providing said tactile stimulating surface on said garment to form said tactile stimulation garment;
   wherein at least one of said selected surfaces is on said collar, thereby to provide a textured surface on said collar, in such a way that said textured surface is reachable for touching by the skin of the chin or the cheeks or the tongue or the lips of said baby using said involuntary movements.

2. The method of claim 1, wherein said surface at said selected location is repeatedly detachable and attachable to said garment.

3. The method of claim 2, comprising selecting a second one of said more frequently reached locations, wherein said textured surface being repeatedly detachable and attachable includes two or more tactile stimulating surfaces one of said two or more tactile stimulating surfaces being configured to be selectively attached at a time of use to said second selected location, said second selected location also being readily reachable in involuntary movements by a hand or tongue or cheeks or lips of said one of said baby when said baby is wearing said garment.

4. The method of claim 1, further comprising selecting a smell for integrating thereof with said tactile stimulating surface.

5. The method of claim 1, further comprising selecting a visual stimulating element for integrating thereof with said tactile stimulating surface.

6. The method of claim 1, further comprising integrating at least one of a visual stimulating element or a smell with said tactile stimulating surface.

7. The method of claim 1, wherein said selecting at least one location is in accordance with statistics, said statistics obtained by said observing, said statistics showing areas most frequently touched by involuntary movements of said baby.

8. A method for designing a garment, the garment being arranged for wearing in a fixed positional arrangement relative to a wearer, the wearer being a baby, the garment having a first plurality of surfaces, the method comprising:
   providing the garment specifically for wearing by said baby, the garment having a collar and being one member of the group consisting of:
   a sleeved garment,
   a garment having legs,
   a garment having a neck opening within shoulders,
   a shirt,
   a dress,
   an overall,
   a coat,
   a jacket,
   a sweatshirt, and
   a sweater,
   said wearing being at successive times and in fixed positional arrangement to said baby, said garment having said first plurality of surfaces;
   selecting a textured material that is suitable for tactile stimulation when placed on said garment;
   observing repeated involuntary baby movements, said observing being to find body regions which are frequently reached or touched;
   selecting garment locations corresponding to said body regions being frequently reached or touched; and
   placing said textured material at said garment locations being selected, said garment locations being selected being in fixed positional arrangement relative to said body regions when said garment is worn;
   wherein at least one of said garment locations is on said collar, thereby to provide a textured surface on said collar, in such a way that said textured surface is reachable for touching by the skin of the chin or the cheeks or the tongue or the lips of said baby using said involuntary movements;
   thereby providing a tactile stimulation baby garment for wearing as an item of clothing by said baby.

* * * * *